United States Patent
Ho et al.

(10) Patent No.: US 10,305,834 B2
(45) Date of Patent: May 28, 2019

(54) SYSTEM AND METHOD FOR MESSAGING BETWEEN OPERATING SYSTEM CONTAINERS

(71) Applicant: Huawei Technologies Co., Ltd., Shenzhen (CN)

(72) Inventors: Alan Pak-Lun Ho, Unionville (CA); Amarpreet Singh, Pune (IN); Sangjoo Lee, Gyeonggi-do (KR)

(73) Assignee: Huawei Technologies Co., Ltd., Shenzhen (CN)

( * ) Notice: Subject to any disclaimer, the term of this patent is extended or adjusted under 35 U.S.C. 154(b) by 240 days.

(21) Appl. No.: 15/187,443

(22) Filed: Jun. 20, 2016

(65) Prior Publication Data

US 2017/0366492 A1    Dec. 21, 2017

(51) Int. Cl.
| | |
|---|---|
| *H04L 12/58* | (2006.01) |
| *G06F 9/54* | (2006.01) |
| *G06Q 40/00* | (2012.01) |
| *H04L 29/08* | (2006.01) |
| *H04L 29/06* | (2006.01) |

(52) U.S. Cl.
CPC ............ *H04L 51/14* (2013.01); *G06F 9/544* (2013.01); *G06F 9/546* (2013.01); *G06Q 40/123* (2013.12); *H04L 51/046* (2013.01); *H04L 51/36* (2013.01); *H04L 63/0272* (2013.01); *H04L 63/0485* (2013.01); *H04L 67/02* (2013.01); *H04L 67/2814* (2013.01)

(58) Field of Classification Search
CPC ... H04L 51/046; H04L 67/02; H04L 63/0272; H04L 63/0485; G06F 91/546; G06Q 40/123
See application file for complete search history.

(56) References Cited

U.S. PATENT DOCUMENTS

| | | | |
|---|---|---|---|
| 7,152,231 B1 * | 12/2006 | Galluscio | G06F 9/544 719/312 |
| 7,417,987 B2 | 8/2008 | Shenoy et al. | |
| 8,719,840 B2 * | 5/2014 | Musial | G06F 21/77 235/492 |
| 9,274,861 B1 | 3/2016 | Karppanen | |
| 9,621,495 B1 * | 4/2017 | Shumate | H04L 51/046 |
| 9,690,637 B2 * | 6/2017 | Angelov | G06F 9/546 |
| 2010/0241729 A1 | 9/2010 | Angelov | |
| 2012/0054875 A1 | 3/2012 | Antill | |
| 2012/0278878 A1 * | 11/2012 | Barkie | H04L 63/0272 726/15 |
| 2016/0080317 A1 | 3/2016 | Brandwine et al. | |

FOREIGN PATENT DOCUMENTS

| | | |
|---|---|---|
| CN | 103259735 A | 8/2013 |
| CN | 105491123 A | 4/2016 |
| EP | 0704796 A2 | 4/1996 |

* cited by examiner

*Primary Examiner* — Kyung H Shin
(74) *Attorney, Agent, or Firm* — Slater Matsil, LLP

(57) ABSTRACT

A method for messaging between operating system containers includes receiving, by a first proxy in a first user space container, a first message from a first service in the first user space container, the first message sent to the first proxy using a first messaging mechanism, forwarding, by the first proxy, the first message to a second proxy in a second user space container, the first message sent to the second proxy using a second messaging mechanism that is different than the first messaging mechanism, and delivering, by the second proxy, the first message to a second service in the second user space container.

26 Claims, 3 Drawing Sheets

SYSTEM AND METHOD FOR MESSAGING BETWEEN OPERATING SYSTEM CONTAINERS

TECHNICAL FIELD

The present invention relates generally to operating systems, and, in particular embodiments, to a system and method for messaging between operating system containers.

BACKGROUND

Generally, virtual systems have several user space instances virtualized at the operating system level. Many devices today, such as smartphones, tablets, and cloud computing systems, are virtualized to include several user space instances, which allows for greater granularity and control over the software on a device. Although a typical operating system includes one kernel space and one user space, a virtualized system may include one kernel space and several user space instances (sometimes called "containers"). Virtualized systems allow each container to be isolated, however, some communication may still be required between containers.

SUMMARY

In accordance with a preferred embodiment of the present invention, a method includes receiving, by a first proxy in a first user space container, a first message from a first service in the first user space container, the first message sent to the first proxy using a first messaging mechanism, forwarding, by the first proxy, the first message to a second proxy in a second user space container, the first message sent to the second proxy using a second messaging mechanism that is different than the first messaging mechanism, and delivering, by the second proxy, the first message to a second service in the second user space container.

In accordance with a preferred embodiment of the present invention, an operating system includes a first user space container comprising a first plurality of processes, and a first message proxy configured to receive a first message from one of the first plurality of processes using a first messaging mechanism, and a second user space container isolated from the first user space container, the second user space container comprising a second message proxy configured to receive the first message from the first message proxy using a second messaging mechanism that is different than the first messaging mechanism, and a second plurality of processes, one of the second plurality of processes configured to receive the first message from the second message proxy.

In accordance with a preferred embodiment of the present invention, a device includes a processor, and a computer-readable medium including programming, the programming including instructions for receiving, by a first proxy in a first user space container, a first message from a first service in the first user space container, the first message sent to the first proxy using a first messaging mechanism, forwarding, by the first proxy, the first message to a second proxy in a second user space container, the first message sent to the second proxy using a second messaging mechanism that is different than the first messaging mechanism, and delivering, by the second proxy, the first message to a second service in the second user space container using the first messaging mechanism.

An advantage of a preferred embodiment of the present invention is that local messaging within an operating system container may be decoupled from inter-container messaging. A container-local process must be granted global messaging privileges in the operating system to perform inter-container messaging. Decoupling local and global messaging may reduce the quantity of privileged processes executing in an operating system. Further, decoupling local and global messaging provides a centralized mechanism for messaging, which allows for greater access control in the operating system. Security and stability of the operating system and the containers may thus be improved.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
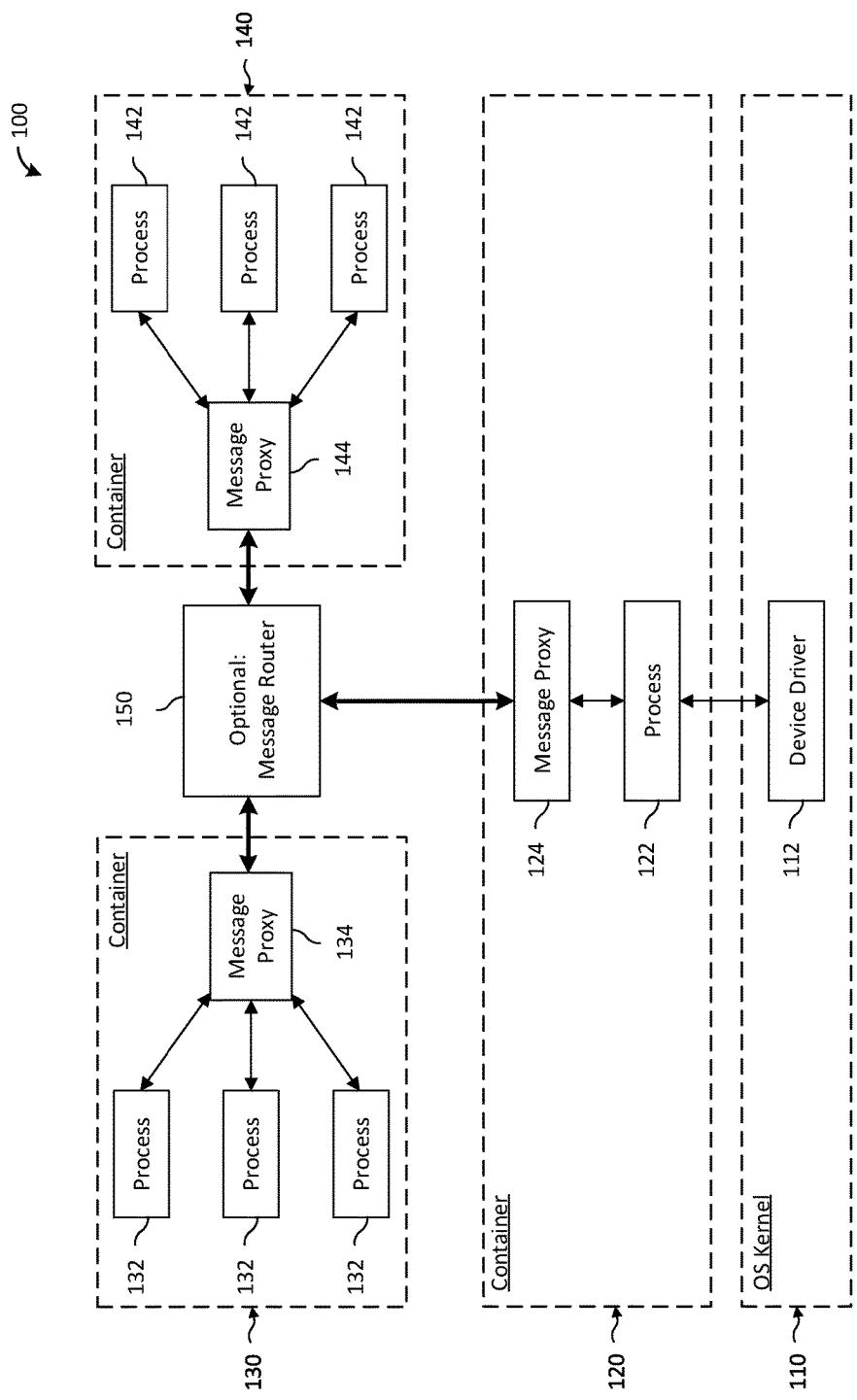
FIG. 1 is a block diagram of an operating system with virtualized containers on a user device.

FIG. 1 is a block diagram of an operating system 100 with virtualized containers on a user device. The operating system 100 uses operating-system-level virtualization, such that the operating system 100 includes one kernel 110 and multiple user space containers 120, 130, 140. The operating system 100 optionally includes a message router 150. The operating system 100 may be an ecosystem on the user device, such as Android, Windows, or iOS.

The kernel 110 includes kernel space components, such as a device driver 112. In some embodiments, the kernel 110 is a Unix-like kernel, such as Linux. In embodiments where the kernel 110 is Linux, the operating system 100 may be Android. The device driver 112 accesses or controls hardware features on the user device, such as input/output (I/O) devices, telephony interfaces, peripheral interfaces, network interfaces, and the like. In embodiments where the device driver 112 is for an I/O device, the device driver 112 may be an audio, video, or touchscreen device driver. In embodiments where the device driver 112 is for a telephony device, the device driver 112 may be a modem device driver. The device driver 112 may be a loadable kernel module, or statically linked to the kernel 110. Although various embodiments below are described with respect to an Android mobile operating system using the Linux kernel, it should be appreciated that embodiment virtualization systems and methods may be implemented with a wide variety of operating systems and kernels.

The containers 120, 130, 140 are user space containers that run on the kernel 110. The containers 120, 130, 140 share the kernel 110, but have user space isolation. As a result, processes in one of the containers 120, 130, 140 do not see other processes or resources in other containers. In embodiments where the kernel 110 is a Linux kernel, the containers 120, 130, 140 may run different Linux distributions such as Ubuntu, Red Hat, Debian, and the like. In embodiments where the operating system 100 is a mobile operating system, the containers 120, 130, 140 may run any mobile operating system that uses the Linux kernel, such as Ubuntu, Tizen, and/or different versions of Android. In such embodiments, the containers 120, 130, 140 may be provided using Linux Containers (LXC). In embodiments where the kernel 110 is a BSD or XNU kernel, the containers 120, 130, 140 may be different jails. The containers 120, 130, 140 each include processes 122, 132, 142 and message proxies 124, 134, 144. Although three user space containers are shown in FIG. 1, it should be appreciated that any quantity of containers could be included with the operating system 100.

The processes 122, 132, 142 execute different threads or tasks in the containers 120, 130, 140, respectively, and may perform different functions. The processes 122, 132, 142 may be software operated by a user, or services in the operating system 100. In the embodiment shown, the process 122 in the container 120 interacts with the device driver 112, and the processes 132, 142 in the containers 130, 140 execute other applications. For example, in embodiments where the device driver 112 is an audio driver, the process 122 may be an audio service sending commands or data to the device driver 112. In such embodiments, the processes 132, 142 in the containers 130, 140 may need to access the device driver 112. In some embodiments, a process in one of the containers may need to notify processes in other containers of an operation to be performed by the sending process. For example, in embodiments where the operating system 100 is an Android operating system, one process may need to send an Intent object to processes in other containers.

Embodiment messaging techniques allow the processes 122, 132, 142 across the different containers 120, 130, 140 to communicate with one another. Inter-container messaging (ICM) may allow the processes 132, 142 to access the device driver 112 in a limited and controlled manner. In some embodiments, ICM is implemented using existing messaging mechanisms supported by the operating system 100. In order to communicate directly with one another, each of the processes 122, 132, 142 may be granted messaging privileges in the operating system 100, and may communicate using mechanisms common to the containers 120, 130, 140. However, as noted above, the containers 120, 130, 140 may run different Linux distributions or user space environments. When the containers 120, 130, 140 run different distributions and/or user space environments, they may be unable to communicate using common messaging mechanisms. Further, increasing the quantity of processes 122, 132, 142 that run as privileged processes may impact system security and stability. Reducing the quantity of privileged processes may reduce the attack surface of the operating system 100.

The message proxies 124, 134, 144 are used by the processes 122, 132, 142 to communicate with one another across the containers 120, 130, 140. The containers 120, 130, 140 include the message proxies 124, 134, 144, respectively. Each of the message proxies 124, 134, 144 act as a centralized ICM gateway for the processes 122, 132, 142 in the respective containers 120, 130, 140. The message proxies 124, 134, 144 forward messages from source processes in their respective containers to the container having the intended recipient process. The message proxy in the recipient container forwards the messages to the recipient process. In some embodiments, the message proxies 124, 134, 144 may themselves be processes or services that are used to proxy messages across the containers 120, 130, 140. In some embodiments, the message proxies 124, 134, 144 communicate directly with one another, in a point-to-point manner. In some embodiments, the message proxies 124, 134, 144 communicate with multiple recipient processes, in a broadcast manner.

The message proxies 124, 134, 144 communicate with the processes 122, 132, 142 using various data structures and messaging mechanisms. In some embodiments, the processes 122, 132, 142 communicate with the message proxies 124, 134, 144 using inter-process communication (IPC) mechanisms, such as message queues, shared memory, named pipes, and the like. In some embodiments, the IPC mechanisms used by the processes 122, 132, 142 to communicate with the message proxies 124, 134, 144 only include IPC mechanisms used for intra-container (sometimes called "local") messaging. The processes 122, 132, 142 may communicate with the message proxies 124, 134, 144 using data structures or formats that are specific to the user space environment of the respective containers 120, 130, 140. For example, the process 132 may communicate with the message proxy 134 using a first data structure and a first IPC mechanism, and the process 142 may communicate with the message proxy 144 using a second data structure and a second IPC mechanism. The message proxies 124, 134, 144 communicate using IPC mechanisms used for inter-container (sometimes called "global") messaging. Limiting the processes 122, 132, 142 to communicating with the message proxies 124, 134, 144 via intra-container IPCs and local messaging formats decouples the processes 122, 132, 142 from system-specific ICM. This may increase the flexibility and reduce the attack surface of the operating system 100.

The message router 150 may be included with the operating system 100 in embodiments where processes across more than two of the containers 120, 130, 140 communicate. In embodiments where the containers 120, 130, 140 communicate in a broadcast manner, they may use the message router 150 to exchange messages. In such embodiments, each of the message proxies 124, 134, 144 communicates with the message router 150 using a common data structure and messaging mechanism. The message router 150 forwards messages from the source message proxy to the recipient message proxy. The message router 150 may be implemented using communication mechanisms described in co-pending U.S. patent application Ser. No. 15/167,676, filed on May 27, 2016, which is incorporated herein by reference. In embodiments where processes across two of the containers communicate, the message proxies may directly communicate; in such embodiments, the message router 150 is not needed. In some embodiments, the containers 120, 130, 140 communicate using other communication mechanisms, e.g., without the message router 150. Although the message router 150 is illustrated as being outside the containers 120, 130, 140, it should be appreciated that the message router 150 may be located in any container, e.g., it may be located in the container 130 or the container 140.

Figure 2:
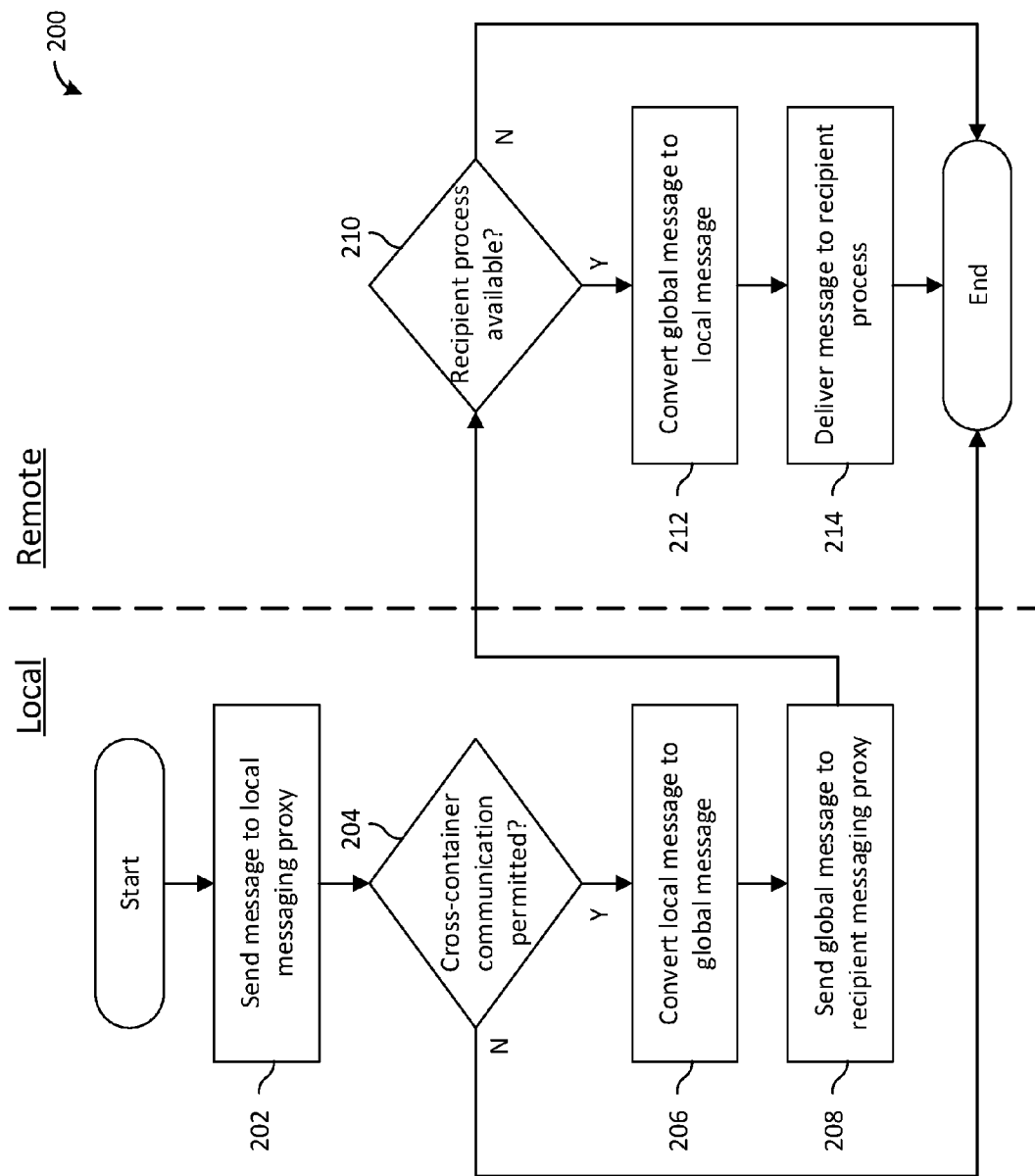
FIG. 2 is a flow diagram of a messaging method.

FIG. 2 is a flow diagram of a messaging method 200. The messaging method 200 may be indicative of operations occurring in an operating system with multiple user spaces, such as the operating system 100. In step 202, a source process creates a message intended for a recipient process and sends it to a source messaging proxy (step 202). The source process and the source messaging proxy are in a source container, and the recipient process is in a recipient container. The source process and the source messaging proxy may communicate in a first messaging format using a first IPC mechanism, such as a local IPC mechanism. The local IPC mechanism may be, e.g., Binder in embodiments where the operating system is Android.

If the source messaging proxy and the source process are permitted by the operating system to communicate across containers (step 204), the message is converted to a global message format (step 206). Converting may include serializing the message, and adding an identification header to the message. In some embodiments, the message is serialized to a text or a binary format. The identification header identifies the destination process. In some embodiments, the header identification is a container and process identifier, such as an integer or string value. In some embodiments, the destination process may be identified using an identification registration framework in the operating system. If the source messaging proxy is not permitted to communicate across containers, the messaging method 200 concludes.

The serialized message is sent from the source messaging proxy to the recipient messaging proxy (step 208). The recipient messaging proxy is identified using the identification header in the message. The message may be sent to the recipient messaging proxy using a global IPC mechanism, such as a Unix domain socket.

Figure 3:
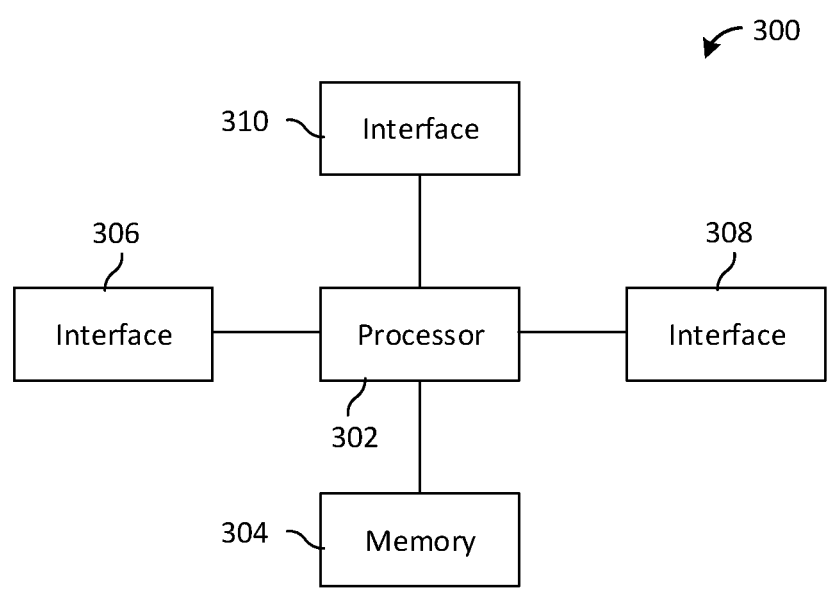
FIG. 3 is a diagram of a processing system.

If the recipient process in the recipient container is available (step 210), the recipient messaging proxy converts the message to a local message format for the recipient container (step 212). In some embodiments, an access control check may also be performed to determine whether the recipient process and/or the recipient container are permitted to receive communications from other containers. Conversion may include removing the identification header from the message, and deserializing the message. If the recipient process is not available, the messaging method 200 concludes. The deserialized message is sent from the recipient messaging proxy to the recipient service (step 214). The recipient messaging proxy and the recipient process may communicate in the first messaging format using the first IPC mechanism, or may communicate in a second messaging format using a second IPC mechanism. When the recipient messaging proxy and the recipient process communicate in the second messaging format, the conversion may include translating the message to the second messaging format. The message may be sent to the recipient container using a local IPC mechanism, such as a Binder in embodiments where the operating system is Android FIG. 3 illustrates a block diagram of an embodiment processing system 300 for performing methods described herein, which may be installed in a host device. As shown, the processing system 300 includes a processor 302, a memory 304, and interfaces 306, 308, 310, which may (or may not) be arranged as shown in FIG. 3. The processor 302 may be any component or collection of components adapted to perform computations and/or other processing related tasks, and the memory 304 may be any component or collection of components adapted to store programming and/or instructions for execution by the processor 302. In an embodiment, the memory 304 includes a non-transitory computer readable medium. The interfaces 306, 308, 310 may be any component or collection of components that allow the processing system 300 to communicate with other devices/components and/or a user. For example, one or more of the interfaces 306, 308, 310 may be adapted to communicate data, control, or management messages from the processor 302 to applications installed on the host device and/or a remote device. As another example, one or more of the interfaces 306, 308, 310 may be adapted to allow a user or user device (e.g., personal computer (PC), etc.) to interact/communicate with the processing system 300. The processing system 300 may include additional components not depicted in FIG. 3, such as long term storage (e.g., non-volatile memory, etc.).

In some embodiments, the processing system 300 is included in a network device that is accessing, or part otherwise of, a telecommunications network. In one example, the processing system 300 is in a network-side device in a wireless or wireline telecommunications network, such as a base station, a relay station, a scheduler, a controller, a gateway, a router, an applications server, or any other device in the telecommunications network. In other embodiments, the processing system 300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

It should be appreciated that one or more steps of the embodiment methods provided herein may be performed by corresponding units or modules. Steps may be performed by a forwarding unit/module, a receiving unit/module, a delivering unit/module, a serializing unit/module, an appending unit/module, an identifying unit/module, a deserializing unit/module, and/or a sending unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving, by a first proxy in a first operating system (OS) distribution running within a first user space container running on an OS kernel of a computing device, a first message from a first process in the first user space container, the first message sent to the first proxy using a first messaging mechanism;
forwarding, by the first proxy, the first message to a second proxy in a second OS distribution running within a second user space container running on the OS kernel of the computing device, the first message sent to the second proxy using a second messaging mechanism that is different than the first messaging mechanism, wherein the second OS distribution is distinct from the first OS distribution, and the first user space container and the second user space container are two distinct user space instances isolated from each other; and
delivering, by the second proxy, the first message to a second process in the second user space container.

2. The method of claim 1, wherein forwarding the first message to the second proxy comprises directly sending the first message from the first proxy to the second proxy.

3. The method of claim 1, wherein forwarding the first message to the second proxy comprises:
sending, by the first proxy, the first message to a router, the first message sent to the router using the second messaging mechanism; and
forwarding, by the router, the first message to the second proxy using the second messaging mechanism.

4. The method of claim 1, wherein delivering the first message to the second process comprises:
sending, by the second proxy, the first message to the second process using the first messaging mechanism.

5. The method of claim 1, wherein delivering the first message to the second process comprises:

sending, by the second proxy, the first message to the second process using a third messaging mechanism that is different than the first messaging mechanism.

6. The method of claim 1, wherein the first message is received by the first proxy in a first format, and wherein the first message is sent to the second proxy in one of the first format or a second format that is different than the first format.

7. The method of claim 6, wherein the first message is delivered to the second process in a third format that is different than the first format and the second format.

8. The method of claim 6, wherein the first message is delivered to the second process in a third format, the third format being the same as the first format.

9. The method of claim 1, further comprising:
receiving, by a third proxy in a third OS distribution running within a third user space container running on the OS kernel of the computing device, a second message sent by the first process in the first user space container using the first messaging mechanism and forwarded by the first proxy to the third proxy using a second messaging mechanism; and
delivering, by the third proxy, the second message to a third process in the third user space container, the second message sent to the third process using one of the first messaging mechanism or a third messaging mechanism.

10. The method of claim 9, wherein the second message is received by the first proxy in a first format, wherein the second message is sent to the third proxy in a second format that is different than the first format, and wherein the second message is delivered to the third process in one of the first format or a third format that is different than the first format and the second format.

11. The method of claim 1, wherein the first message is a description of an operation to be performed by the second process.

12. The method of claim 1, wherein forwarding, by the first proxy, the first message to the second proxy comprises:
serializing, by the first proxy, the first message to produce a serialized message;
appending, by the first proxy, an identifier to the serialized message; and
sending, by the first proxy, the serialized message to the second proxy using the second messaging mechanism.

13. The method of claim 12, wherein delivering, by the second proxy, the first message to the second process comprises:
identifying, by the second proxy, the second process according to the identifier;
deserializing, by the second proxy, the serialized message to produce the first message; and
sending, by the second proxy, the first message to the second process.

14. The method of claim 1, wherein the first messaging mechanism is an intra-container inter process communication (IPC) mechanism, and the second messaging mechanism is an inter-container IPC mechanism.

15. An operating system (OS) for a computing device, the operating system comprising computer-readable instructions, which when executed by a processor of the computing device cause the computing device to:
virtualize a first user space container running on a kernel of the OS, the first user space container comprising:
a first plurality of processes;
a first OS distribution; and
a first message proxy configured to receive a first message from one of the first plurality of processes using a first messaging mechanism; and
virtualize a second user space container running on the kernel of the OS and isolated from the first user space container, the second user space container being isolated and distinct from the first user space container, and the second user space container comprising:
a second message proxy configured to receive the first message from the first message proxy using a second messaging mechanism that is different than the first messaging mechanism;
a second OS distribution distinct from the first OS distribution; and
a second plurality of processes, one of the second plurality of processes configured to receive the first message from the second message proxy.

16. The operating system of claim 15, wherein:
the kernel of the OS comprises a device driver, the one of the second plurality of processes configured to access the device driver according to the first message received from the one of the first plurality of processes.

17. The operating system of claim 15, further comprising:
a message router configured to receive the first message from the first message proxy using the second messaging mechanism, and to forward the first message to the second message proxy using the second messaging mechanism.

18. The operating system of claim 15, wherein the first message proxy is configured to directly deliver the first message to the second message proxy using the second messaging mechanism.

19. The operating system of claim 15, wherein the first messaging mechanism is a local inter-process communication mechanism, and the second messaging mechanism is a global inter-process communication mechanism.

20. The operating system of claim 15, wherein the one of the second plurality of processes is configured to receive the first message from the second message proxy using the first messaging mechanism.

21. The operating system of claim 15, wherein the one of the second plurality of processes is configured to receive the first message from the second message proxy using a third messaging mechanism.

22. The operating system of claim 21, wherein the first message is received by the first message proxy in a first message format, and wherein the first message is received by the second message proxy in a second message format that is different than the first message format.

23. The operating system of claim 22, wherein the first message is received by the one of the second plurality of processes in a third message format, and wherein the second message proxy translates the first message into the third message format.

24. The operating system of claim 22, wherein the first message is received by the one of the second plurality of processes in the first message format.

25. The operating system of claim 15, wherein the first message proxy is further configured to serialize and identify the first message to produce a second message, and wherein the second message proxy is further configured to deserialize the second message to produce the first message.

26. A computing device comprising:
a processor; and
a computer-readable medium including programming, the programming including an operating system comprising instructions executable by the processor for:

receiving, by a first proxy in a first operating system (OS) distribution running within a first user space container running on an OS kernel of the computing device, a first message from a first process in the first user space container, the first message sent to the first proxy using a first messaging mechanism;

forwarding, by the first proxy, the first message to a second proxy in a second OS distribution running within a second user space container running on the OS kernel of the computing device, the first message sent to the second proxy using a second messaging mechanism that is different than the first messaging mechanism, wherein the second OS distribution is distinct from the first OS distribution, and the first user space container and the second user space container are two distinct user space instances isolated from each other; and delivering, by the second proxy, the first message to a second process in the second user space container using the first messaging mechanism.

* * * * *